3,368,046
BRAKE FLUID LEVEL INDICATOR SYSTEM
Douglas J. Wing, St. Clair Shores, Mich., assignor to General Motors Corporation, Detroit, Mich., a corporation of Delaware
Filed Mar. 4, 1966, Ser. No. 531,813
3 Claims. (Cl. 200—83)

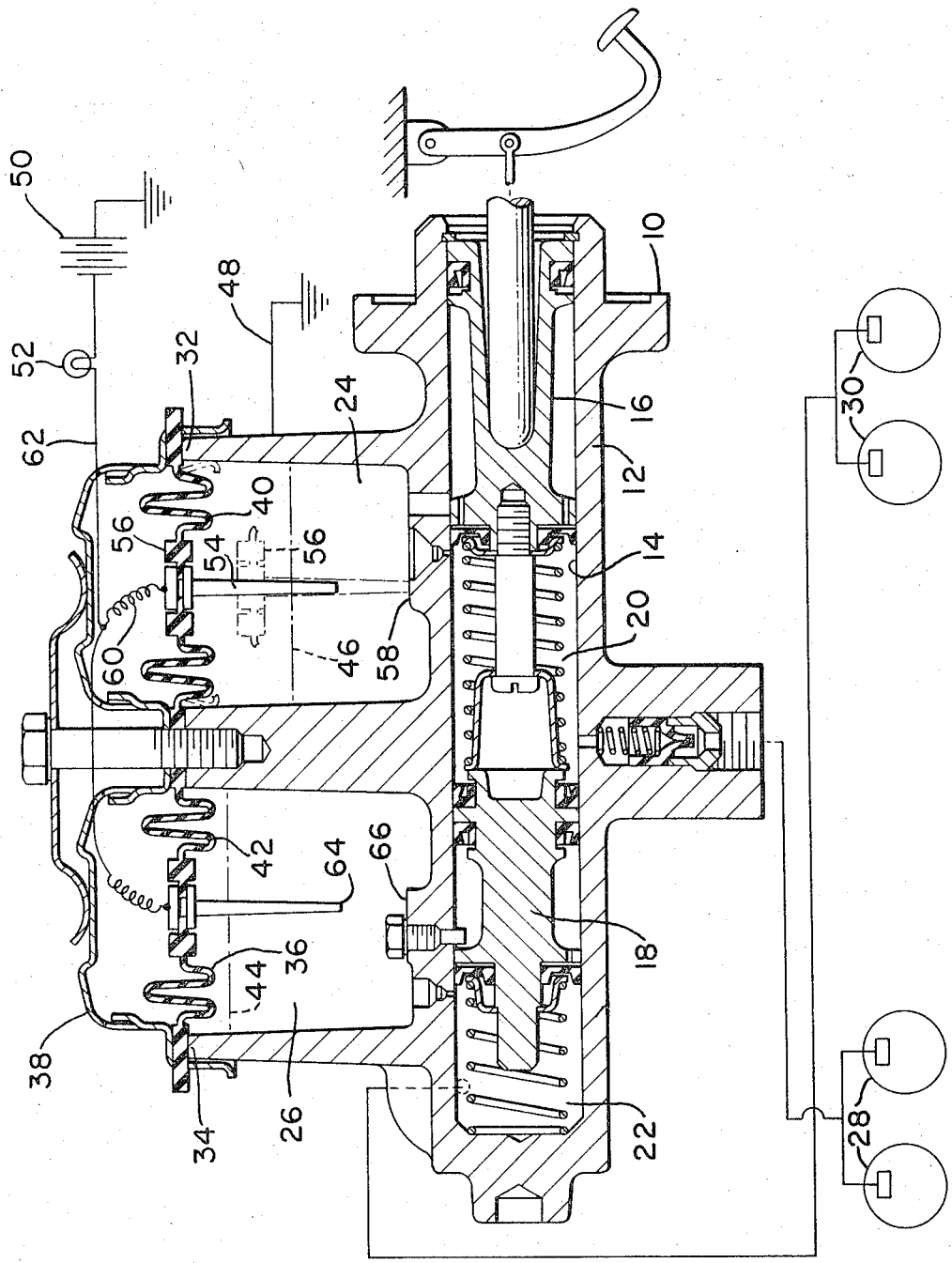

ABSTRACT OF THE DISCLOSURE

A vehicle brake master cylinder assembly having a system which provides an indication of the brake fluid level by mounting an electrical contact on the diaphragm, sealing the top of the fluid reservoir and utilizing the housing forming the reservoir as another contact. The diaphragm follows the surface level of the fluid in the reservoir and causes the contacts to engage when the fluid is sufficiently depleted. Engagement of the contacts actuates an indicator sensible by the vehicle operator. The contact on the diaphragm may be so positioned as to indicate loss of fluid at a predetermined fluid level. Multiple reservoir master cylinder assemblies utilizing the invention have a diaphragm and a pair of electrical contacts associated with each reservoir cavity, the indicator circuit being energized when any pair of contacts close. The diaphragm not only seals the reservoir but also acts as an electrical insulator for the contact movable therewith.

---

The invention relates to a system providing an indication of the level of brake fluid in the master cylinder assembly of a vehicle brake system. The invention more particularly relates to a system wherein the brake fluid reservoir means is sealed by diaphragm means which moves with the change in brake fluid level, such movement being utilized to actuate the indicator system.

It is desirable to appraise a vehicle operator of the existence of a low brake fluid level condition prior to the time wherein the brake fluid in the reservoir is used up and the brakes fail for lack of a supply of fluid. Structure embodying the invention utilizes the characteristics of a seal diaphragm in following the variation in brake fluid level during normal brake operation, and also under conditions wherein brake fluid is lost, to provide an indication of brake fluid level. An electrical circuit is provided which has a suitable warning device such as a lamp or buzzer arrangement, and which is energized when the brake fluid level reaches a predetermined low condition. The electrical circuit includes a pair of contacts which are normally open while the brake fluid level is within desired level limits, and which closes when the brake fluid level decreases to a predetermined point. One of the contacts is mounted on a collapsible diaphragm seal covering the top of the reservoir, and the other contact is provided within the reservoir on a surface normally covered with brake fluid toward which the movable contact is moved as the diaphragm collapses into the reservoir upon a decrease in fluid level. In its preferred embodiment the housing of the master cylinder assembly which forms the reservoir is connected to electrical ground and provides one of the contacts, so that only one additional contact need be manufactured and installed. The diaphragm provides excellent electrical insulation for the movable contact since such diaphragms are made of a rubber-like material having excellent electrical insulating properties.

In the drawing:

The single figure shows a brake master cylinder assembly with parts broken away and in section, with a schematic illustration of the vehicle brake system and the indicator system embodying the invention.

The master cylinder assembly 10 has a housing 12 in which is formed a bore 14 containing the brake pressurizing pistons 16 and 18 and forming suitable brake fluid pressurizing chambers 20 and 22. The housing is also formed to provide a brake fluid reservoir 24 connected through suitable compensating ports with chamber 20, and reservoir 26 connected through a suitable compensating port with chamber 22. Pressurizing chamber 20 is illustrated as being fluid connected to the vehicle front wheel brakes 28, and pressurizing chamber 22 is illustrated as being fluid connected to the rear wheel brakes 30.

The upper ends 32 and 34 of the reservoirs 24 and 26 are covered and sealed by suitable diaphragm means 36, held in place by ventilated cap means 38. The diaphragm means 36, which serves two separate reservoirs in the particular master cylinder assembly illustrated, has two convoluted sections 40 and 42. Section 40 provides a cover and seal for reservoir 24, and section 42 provides a cover and seal for reservoir 26. When the reservoirs are filled to their normal levels, indicated in reservoir 26 by fluid level line 44, the diaphragm sections are in the position shown in solid lines of the drawing. However, as the fluid level decreases, as indicated by the fluid level line 46 in reservoir 24, the diaphragm section follows the fluid level downwardly since the side of the diaphragm is exposed at atmospheric pressure and the lower side of the diaphragm is exposed to the pressure in the associated reservoir. Thus, for example, when the fluid level in reservoir 24 falls to the level line 46, the diaphragm section 40 will assume the position shown therein in dashed lines.

The elecrtical circuit for indicating the fluid level condition includes an electrical ground 48 for the housing 12, a suitable source of electrical energy schematically illustrated as battery 50, and operator-sensible means energized when the circuit is energized, such means being illustrated as lamp 52. The circuit also includes a movable contact 54 connected to the diaphragm section 40 and extending into the reservoir 24.

Each diaphragm section 40 is provided with a center reinforcing section 56 to which the movable contact 54 is secured and through which it extends. The length of the contact 54 extending underneath the diaphragm section 40 is determined by the depth of the reservoir 24 and the low fluid level at which the indicator system is to be rendered operative. The movable contact 54 is engageable with contact 58, which in its preferable and simplest form is a portion of the housing 12 which forms a part of the reservoir 24. Since the movable contact 54 is preferably positioned in the center of the diaphragm section 40, the contact 59 is preferably positioned in the bottom of the reservoir. A flexible electrical wire 60 connects the contact 54 to a suitable electrical lead 62 leading to the lamp 52 and thence to the battery 50. Thus when the diaphragm section 40 moves downwardly to the position shown in dashed lines, the movable contact 54 also moves downwardly to the position shown in dashed lines so that it engages contact 58, electrically actuating the indicator circuit and lighting lamp 52. The vehicle operator is thus warned that a low brake fluid level condition exists.

When separate reservoirs are utilized, a similar movable contact 64 is provided, as for the diaphragm section 42, and is in alignment so that it can engage the contact 66. In the indicator circuit illustrated, the contacts 54, 58 and 64, 66 are arranged in parallel so that the closing of either set of contacts will energize the lamp 52. While in some instances it may be preferable to provide separate indicator circuits for each reservoir, a single such indicator lamp is sufficient and is economically advantageous, When the lamp indicates a low fluid level, the vehicle operator is clearly warned to check the brake fluid level.

Since this is done by removing the cap 38 and the diaphragm means 36, the particular reservoir which is low can be discerned without any undue delay.

What is claimed is:

1. A brake fluid level indicator system comprising: a brake master cylinder assembly having a housing including a brake fluid reservoir; a cover mounted on said reservoir and including collapsive diaphragm means covering the free surface of brake fluid in said reservoir and movably positioned by differential pressure acting thereon in a predetermined relation to said brake fluid free surface as the height of said brake fluid free surface varies during operation of said master cylinder assembly; an indicator circuit having operator-sensible indicator means therein; means on a fluid contacting surface of said reservoir provding a first electrical contact in said circuit; and means secured to said diaphragm means providing a second electrical contact in said circuit; said second electrical contact moving with said diaphragm means and at a predetermined reservoir fluid level contacting said first electrical contact to complete said circuit and energize said operator-sensible indicator means, said diaphragm means having a plurality of convolutions and a reinforced center section, said second electrical contact extending through said reinforced center section and into said reservoir and having a length in said reservoir calibrated in relation to the depth of said reservoir to provide electrical contact of said contacts at a predetermined fluid level.

2. A brake fluid level indicator system comprising: a brake master cylinder assembly having a housing including a brake fluid reservoir; a cover mounted on said reservoir and including collapsive diaphragm means covering the free surface of brake fluid in said reservoir and movably positioned by differential pressure acting thereon in a predetermined relation to said brake fluid free surface as the height of said brake fluid free surface varies during operation of said master cylinder assembly; an indicator circuit having operator-sensible indicator means therein; means on a fluid contacting surface of said reservoir providing a first electrical contact in said circuit; and means secured to said diaphragm means providing a second electrical contact in said circuit; said second electrical contact moving with said diaphragm means and at a predetermined reservoir fluid level contacting said first electrical contact to complete said circuit and energize said operator-sensible indicator means, said master cylinder assembly having a plurality of reservoir cavities each having diaphragm means and first and second electrical contacts associated therewith, said indicator circuit being energized when any one of said second electrical contacts moves to contact the associated one of said first contacts to close said indicator circuit.

3. A brake fluid level indicator system comprising: a brake master cylinder assembly having a housing including a brake fluid reservoir; a cover mounted on said reservoir and including collapsive diaphragm means covering the free surface of brake fluid in said reservoir and movably positioned by differential pressure acting thereon in a predetermined relation to said brake fluid free surface as the height of said brake fluid free surface varies during operation of said master cylinder assembly; an indicator circuit having operator-sensible indicator means therein; means on a fluid contacting surface of said reservoir providing a first electrical contact in said circuit; and means secured to said diaphragm means providing a second electrical contact in said circuit; said second electrical contact moving with said diaphragm means and at a predetermined reservoir fluid level contacting said first electrical contact to complete said circuit and energize said operator-sensible indicator means, said cover including means securing said diaphragm means to the top of said reservoir and atmospherically vented to maintain atmospheric pressure on the upper side of said diaphragm means, said diaphragm means sealing said reservoir and acting as an electrical insulator for said second electrical contact relative to the housing of said master cylinder assembly.

References Cited

UNITED STATES PATENTS

| 1,456,663 | 5/1923 | Willis | 200—81.5 |
| 2,566,704 | 9/1951 | Leibing | 200—83 |
| 2,253,260 | 8/1941 | Alcorn | 200—82 |
| 2,744,977 | 5/1956 | Lombard et al. | 200—82 |
| 3,118,985 | 1/1964 | Feibush | 200—82 |

FOREIGN PATENTS 118,081    2/1947    Sweden.

BERNARD A. GILHEANY, *Primary Examiner.*

H. B. GILSON, *Assistant Examiner.*

UNITED STATES PATENT OFFICE
CERTIFICATE OF CORRECTION

Patent No. 3,368,046                         February 6, 1968

Douglas J. Wing

It is hereby certified that error appears in the above numbered patent requiring correction and that the said Letters Patent should read as corrected below.

Column 2, line 24, before "side" insert -- upper --; line 69, for "advantageous," read -- advantageous. --.

Signed and sealed this 15th day of April 1969.

(SEAL)
Attest:

Edward M. Fletcher, Jr.
Attesting Officer

EDWARD J. BRENNER
Commissioner of Patents